Figure 1:
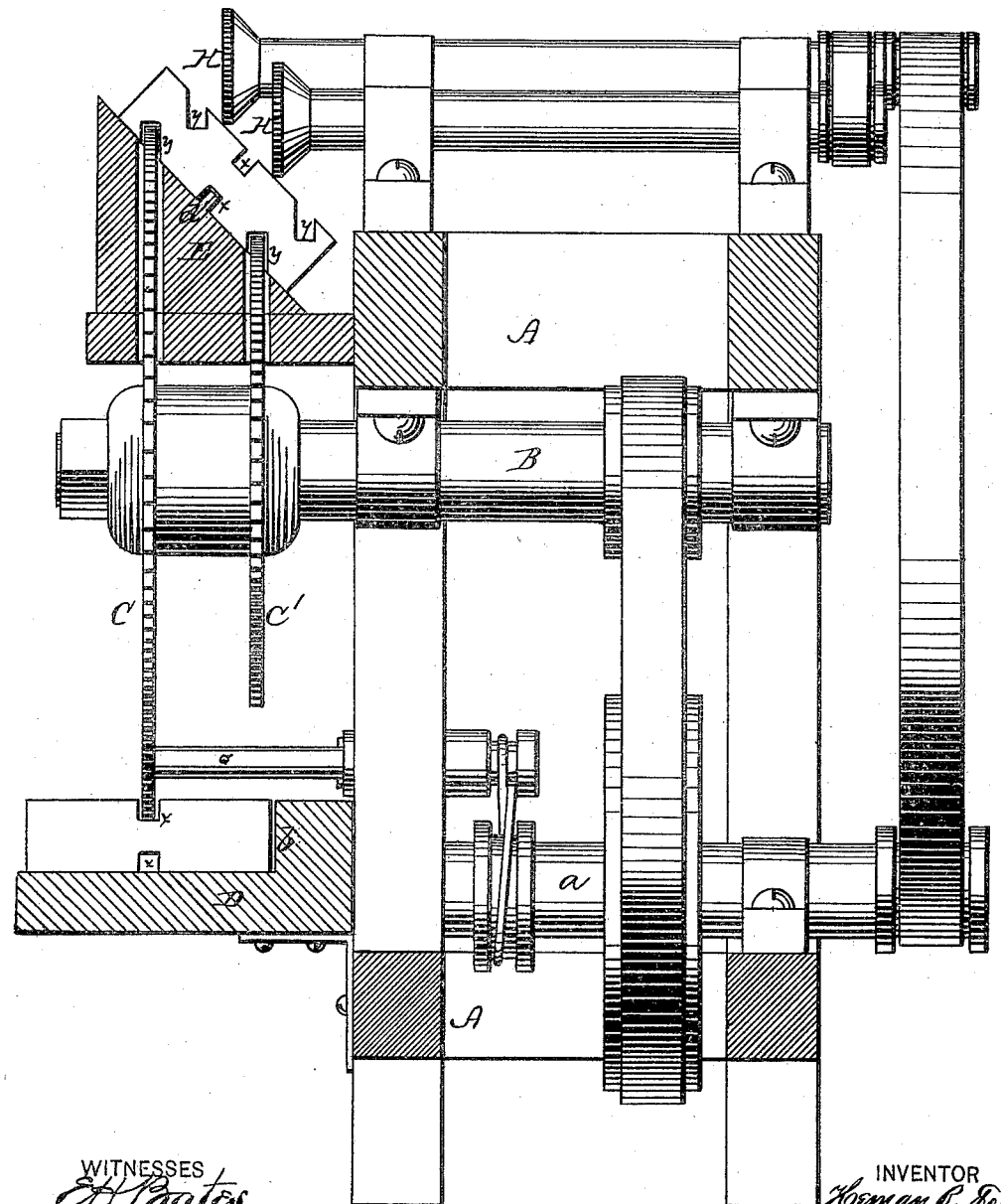

H. R. FRENCH.
MACHINES FOR MAKING SLIDES FOR EXTENSION-TABLES.
No. 172,414. Patented Jan. 18, 1876.

WITNESSES
INVENTOR
ATTORNEYS

2 Sheets—Sheet 2.
H. R. FRENCH.
MACHINES FOR MAKING SLIDES FOR EXTENSION-TABLES.
No. 172,414. Patented Jan. 18, 1876.
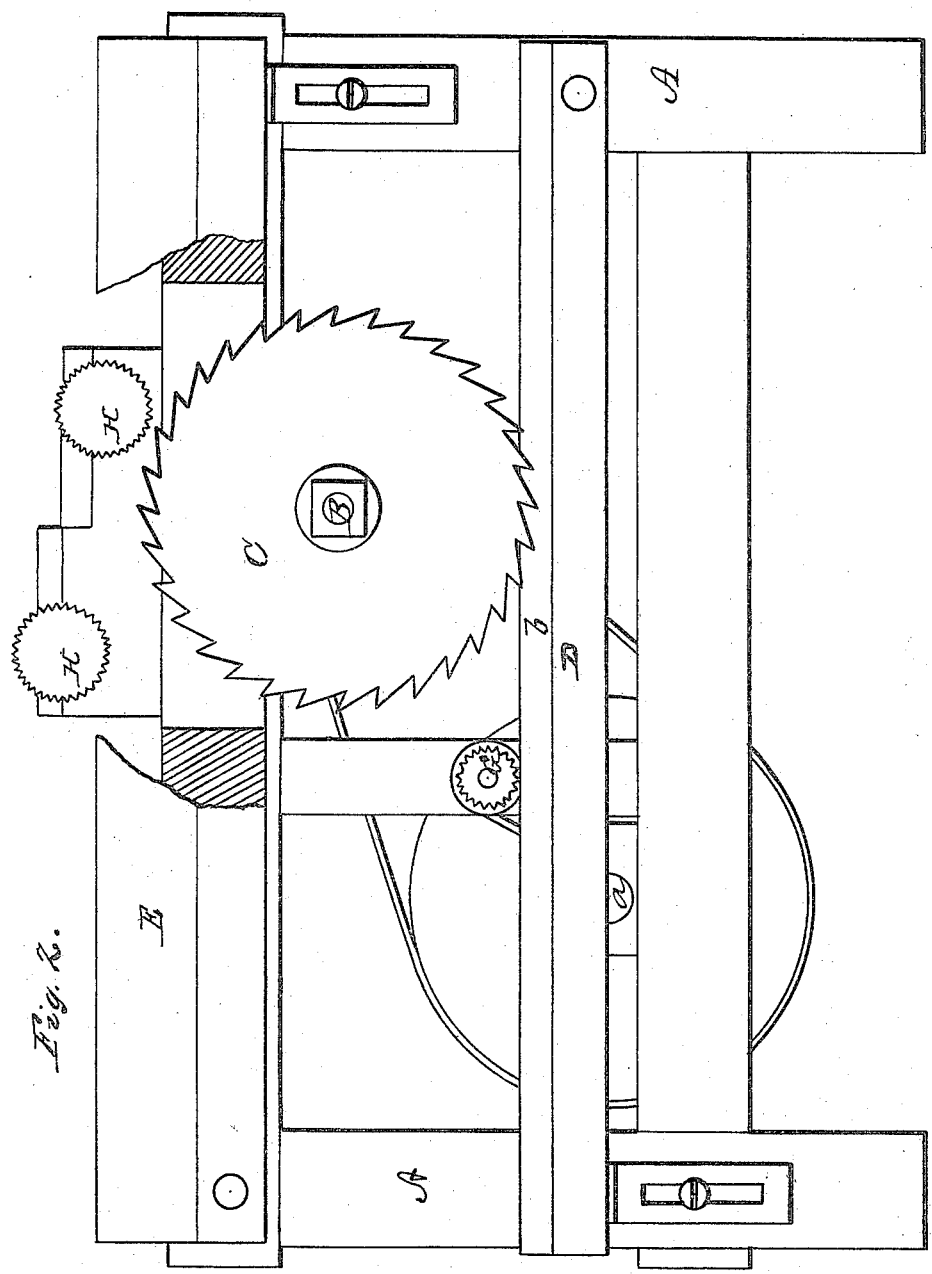
WITNESSES
INVENTOR
ATTORNEYS

UNITED STATES PATENT OFFICE.

HEMAN R. FRENCH, OF WEST RANDOLPH, VERMONT.

IMPROVEMENT IN MACHINES FOR MAKING SLIDES FOR EXTENSION-TABLES.

Specification forming part of Letters Patent No. 172,414, dated January 18, 1876; application filed July 24, 1875.

*To all whom it may concern:*

Be it known that I, HEMAN R. FRENCH, of West Randolph, in the county of Orange and State of Vermont, have invented a new and valuable Improvement in Machines for Making Slides for Extension-Tables; and I do hereby declare that the following is a full, clear, and exact description of the construction and operation of the same, reference being had to the annexed drawings making a part of this specification, and to the letters and figures of reference marked thereon.

Figure 1 of the drawings is a representation of a transverse vertical section of my machine, and Fig. 2 is a side view, part sectional, of the same.

My invention relates to machines for cutting the grooves in extension-table slides; and it consists in the construction and novel arrangement of the frame with one level and one inclined bed, two saws of unequal diameter on the same arbor, and the feed-rollers, as will be hereinafter more fully set forth.

In the annexed drawings, A represents the frame of my machine, constructed in any suitable manner to receive the various working parts. $a$ is the driving-shaft, to which motion is communicated from any convenient power, and from which the various operating parts are driven by means of pulleys and belts arranged substantially as shown in the drawings. B is the saw-arbor, upon the outer end of which are secured two circular saws, C and C', of unequal diameter, the larger saw C being on the outside or in front of the smaller saw C'. Below the saws is a level or horizontal bed, D, formed with a shoulder or offset, $b$; and above the saws is a beveled or inclined bed, E, having slots or mortises through which the saws work. Both of these beds are adjustable on the frame A vertically up and down, and the inclined bed E is formed with a longitudinal rib, $d$, in the center between the slots or mortises made for the saws. G represents a feed-roller, arranged over the level bed D, and over the beveled bed E are two feed-rollers, H H, arranged in different horizontal planes, and one projecting beyond the other, as shown in the drawings. The table-slide to be grooved, having first been cut the proper size, is placed on the bed D against the shoulder or offset $b$, and the larger saw C operating thereon the center straight groove $x$ is cut in the same, first in one side and then in the other. The slide is then placed on the beveled bed E with the groove $x$ over the rib $d$, when the two saws will operate thereon to cut the inclined grooves $y$ $y$, one on each side of the center groove $x$, at the same time. The rib or tongue $d$ acts as a guide for the slide to run on, and as the inclined grooves are cut from the center groove the slides must all be alike. During the operation the slides are held down to the beds by the feed-rollers.

What I claim as new, and desire to secure by Letters Patent, is—

In a machine for grooving extension-table slides, the saws C C' of unequal diameter placed upon the same arbor, in combination with the slotted inclined bed E and feed-rollers H, substantially as specified.

In testimony that I claim the above I have hereunto subscribed my name in the presence of two witnesses.

HEMAN R. FRENCH.

Witnesses:
  E. J. McWAIN,
  GEORGE RANNEY.